United States Patent
Meier et al.

(10) Patent No.: US 8,656,139 B2
(45) Date of Patent: Feb. 18, 2014

(54) DIGITAL PROCESSOR FOR PROCESSING LONG AND SHORT POINTERS AND CONVERTING EACH BETWEEN A COMMON FORMAT

(75) Inventors: Stephan Meier, Los Altos, CA (US);
John G. Favor, Scotts Valley, CA (US);
Evan Gewirtz, San Ramon, CA (US);
Robert Hathaway, Sunnyvale, CA (US); Eric Trehus, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 348 days.

(21) Appl. No.: 13/045,919

(22) Filed: Mar. 11, 2011

(65) Prior Publication Data
US 2012/0233414 A1   Sep. 13, 2012

(51) Int. Cl.
*G06F 12/00* (2006.01)
(52) U.S. Cl.
USPC ........................................................ 711/212
(58) Field of Classification Search
USPC ........................................................ 711/212
See application file for complete search history.

(56) References Cited

U.S. PATENT DOCUMENTS

| 2003/0120903 | A1* | 6/2003 | Roussel | 712/221 |
| 2006/0106986 | A1* | 5/2006 | Bacon et al. | 711/125 |
| 2009/0119321 | A1* | 5/2009 | Mitran | 707/101 |

* cited by examiner

Primary Examiner — Jared Rutz

(57) ABSTRACT

A digital processor stores pointers of different sizes in memory. The processor, specifically, executes instructions to store a long or short pointer. Long pointers reference any address in the memory's logical address space, while short pointers merely reference any address in a subset of that space. However, short pointers are smaller in size as stored in memory than long pointers. Long pointers thus support relatively large address range capabilities, while short pointers use less memory. The processor also executes instructions to load a long or short pointer into the register file, and does so in a way that does not require the processor to distinguish between the different pointers when executing other instructions. Specifically, the processor converts long and short pointers into a common format for loading into the register file, and converts pointers in the common format back into long or short pointers for storing in the memory.

27 Claims, 9 Drawing Sheets

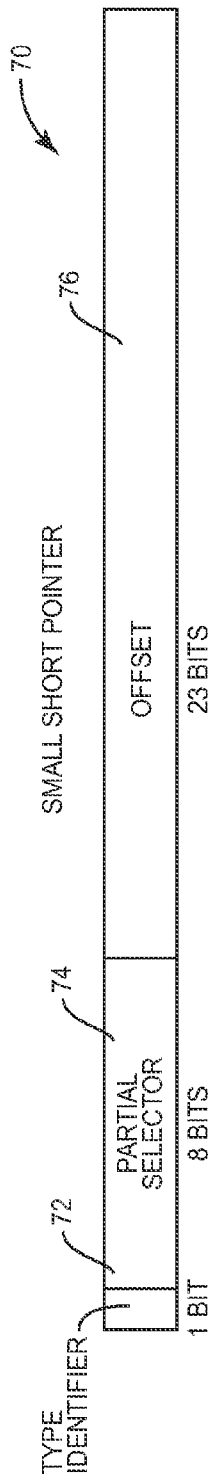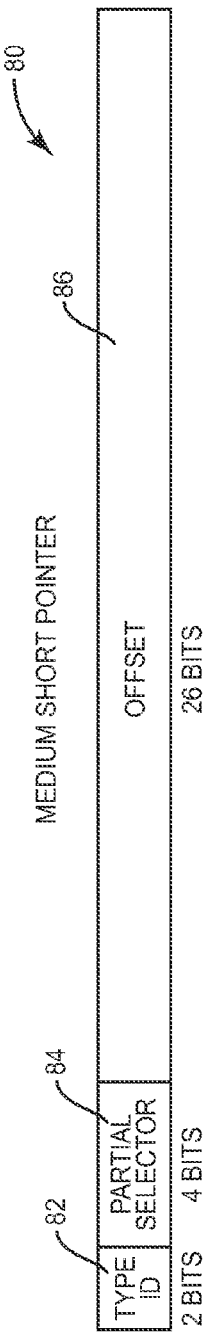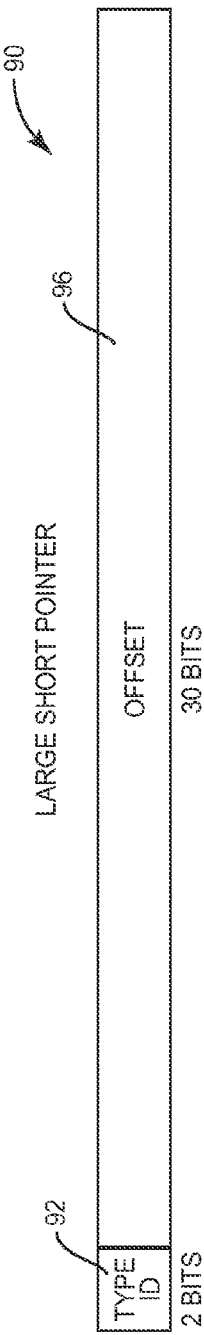
FIG. 6A
FIG. 6B
FIG. 6C

DIGITAL PROCESSOR FOR PROCESSING LONG AND SHORT POINTERS AND CONVERTING EACH BETWEEN A COMMON FORMAT

TECHNICAL FIELD

The present invention relates generally to storage of pointers in memory and, more particularly, to methods and apparatus configured to store pointers of different sizes in memory.

BACKGROUND

A digital processor executes a sequence of instructions in order to perform a specific task. These instructions; any data used, manipulated, or produced as part of the task; and any other relevant information are stored in memory accessible to the processor. When executing a store instruction, the processor stores information in the memory. When executing a load instruction, the processor retrieves information from the memory and loads it into a register file. This register file includes registers specified in the instruction set architecture implemented by the processor.

An instruction refers to one or more addresses that specify particular memory location(s) relevant to execution of the instruction. For example, a store instruction refers to an address that specifies a memory location at which information is to be stored. A load instruction refers to an address that specifies a memory location from which information is to be retrieved.

For various reasons, including security, multi-programming, and others, instructions do not refer to actual physical addresses of the memory; that is, the actual addresses presented on an address bus that accesses the memory. Instead, instructions refer to so-called logical addresses of the memory, and a memory management unit between the processor and the memory translates logical addresses into physical addresses, and vice versa. The set of all logical addresses of a memory constitutes the logical address space of that memory.

A pointer is a data construct whose value is the logical address of another value stored elsewhere in memory. A pointer therefore references (i.e., points to) another value using that value's logical address. Convention dictates that a digital processor use pointers of a certain, fixed size, and that this size permits any given pointer to reference the full range of logical addresses in the memory's logical address space. For instance, a digital processor may use pointers that have a fixed size of 32 bits, which permits a pointer to reference any logical address in a memory that has a 4 Gigabyte (GB) logical address space.

Limiting a digital processor to use of pointers with one, fixed size of course simplifies the processor's instruction set architecture. However, the limitation also artificially increases the memory capacity and bandwidth required to store pointers. Even if a particular pointer does not need to reference the full range of the memory's logical address space, that pointer must still have the same, fixed size as another pointer that does need to reference the full range.

SUMMARY

Teachings herein advantageously include a digital processor operative to store pointers of different sizes in memory. So-called long pointers reference the full range of logical addresses in the memory's logical address space, whereas short pointers reference only a subset of those logical addresses. Short pointers are correspondingly smaller in size as stored in the memory than long pointers. Long pointers thus support relatively large address range capabilities, when needed, while short pointers use less memory when address range requirements are relatively small.

In some embodiments, for example, a digital processor is configured to execute instructions to store a long pointer in the memory, and is also configured to execute instructions to store a short pointer in the memory. A long pointer references any address in the logical address space of the memory, but is relatively larger in size as stored in the memory than a short pointer. Conversely, a short pointer references any address in a subset of the logical address space, but is advantageously smaller in size as stored in the memory than a long pointer.

The processor is also configured to execute instructions to load a long pointer into a register file (which includes registers specified in the processor's instruction set architecture), and to execute instructions to load a short pointer into the register file. Whether loading a long pointer or short pointer, the processor converts the pointer into a common format for loading into the register file. This way, the processor need not otherwise distinguish between long and short pointers in executing subsequent instructions. Of course, to nonetheless distinguish between long and short pointers as stored in memory, the processor converts pointers in the common format into long or short pointers for storing in memory.

In at least some embodiments, the processor converts between the common format and long or short pointers by adding or removing padding, e.g., as needed for achieving certain predetermined results associated with the memory or register file. For example, the processor may add or remove padding from long or short pointers, as needed to make pointers load into the register file with a predetermined size that is associated with the common format. Conversely, the processor may add or remove padding from pointers in the common format, as needed to make long or short pointers store in the memory with some predetermined alignment that makes memory accesses more efficient.

Furthermore, in one or more embodiments, the memory's logical address space comprises a predetermined number of logical segments. Each of these segments includes a number of logical addresses. Both long and short pointers reference any one of the segments in the sense that the ultimate logical address referenced by the pointer may be included within any one of those segments. Long and short pointers differ, however, in that long pointers reference any address within a segment, while short pointers reference any address in only a subset of a segment. In these embodiments, therefore, a short pointer references any address in a subset of the memory's logical address space, where such subset consists of non-contiguous portions of logical memory segments.

In some embodiments, long pointers have a size of 64 bits as stored in memory, while short pointers have a size of 32 bits. When loading pointers into the register file, though, the processor converts both long and short pointers into a common format that has a size of 48 bits.

Moreover, in at least one embodiment, the processor is actually configured to execute instructions to load or store different types of short pointers, where different types of short pointers reference addresses in subsets of different sizes.

Of course, the processor may be configured to execute other instructions as well. That is, the instructions described above for loading and storing pointers represent just some of the instructions in the instruction set architecture (ISA) implemented by the processor. The processor's ISA may therefore also include instructions to execute arithmetic or logical operations, as well as to load or store other types of data, such as integers. In fact, in one or more embodiments, the processor 10 is configured to execute instructions to load or store integers of different sizes that correspond to sizes of the long and short pointers.

In this regard, the digital processor may more generally be understood in terms of its relative configuration with respect to integers and pointers. A digital processor in this context is configured to execute instructions to load or store differently sized integers (e.g., 64 bit and 32 bit). The digital processor is also configured to execute instructions to load or store correspondingly sized pointers (e.g., 64 bit and 32 bit).

Of course, the present invention is not limited by the above features and advantages. Those of ordinary skill in the art will appreciate additional features and advantages upon reading the following detailed description of example embodiments, and reviewing the figures included therein.

BRIEF DESCRIPTION OF THE DRAWINGS

FIGS. 6A-6C are block diagrams illustrating different types of short pointers that, according to some embodiments, include self-identifying bits.

DETAILED DESCRIPTION

Figure 1:
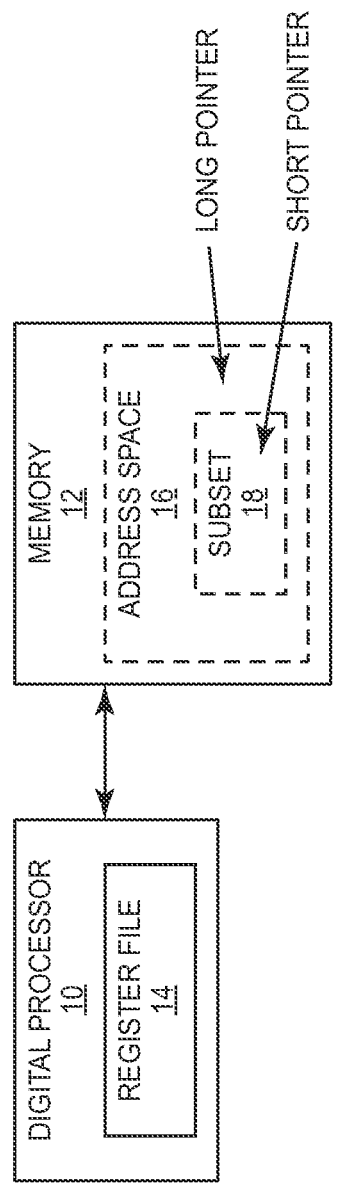
FIG. 1 is a block diagram of a digital processor operative to store pointers in a logically segmented memory, according to one or more embodiments.

FIG. 1 depicts a digital processor 10 according to various embodiments. As shown, the processor 10 is communicatively coupled to a logically segmented memory 12. The processor 10 is configured to execute instructions to store information in this memory 12. The processor 10 is also configured to execute instructions to retrieve information from the memory 12 and to load that information into a register file 14, e.g., for processing. The register file 14 includes registers specified in the instruction set architecture implemented by the processor 10.

The processor 10 executes these instructions in a logical, rather than physical, address space 16 of the memory 12. That is, instead of executing instructions that refer to the actual, physical addresses of the particular memory locations relevant to the instructions, the processor 10 executes instructions that refer to logical addresses of those memory locations. A memory management unit (not shown) translates these logical addresses into physical addresses, and vice versa, for actual memory access. The set of all logical addresses of the memory 12 constitutes the logical address space 16 of that memory 12. This logical address space 16 therefore has a predetermined size.

A pointer is one type of information that the processor 10 stores in the memory 12, or loads into the register file 14, by executing instructions to that effect. A pointer is a data construct whose value is the logical address of another value stored elsewhere in memory 12. A pointer therefore references (i.e., points to) another value using that value's logical address.

Notably, the processor 10 is configured to store pointers of different sizes in the memory 12. Specifically, the processor 10 is configured to execute instructions to store a so-called long pointer in the memory 12, and is also configured to execute instructions to store a so-called short pointer in the memory 12. A long pointer references any address in the logical address space 16 of the memory 12; that is, a long pointer has full address range capability across the memory's logical address space 16. A long pointer, however, is relatively larger in size as stored in the memory 12 than a short pointer. Conversely, a short pointer references any address in only a subset 18 of the logical address space 16; i.e., a short pointer has limited address range capability across the memory's logical address space 16. But a short pointer is advantageously smaller in size as stored in the memory 12 than a long pointer. A long pointer thus supports relatively large address range capabilities, when needed, while a short pointer uses less of memory 12 when address range requirements are relatively small.

Correspondingly, the processor 10 is configured to execute instructions to load a long pointer into the register file 14, and to execute instructions to load a short pointer into the register file 14. Whether loading a long pointer or short pointer, the processor 10 converts the pointer into a common format for loading into the register file 14. This way, the processor 10 need not otherwise distinguish between long and short pointers in executing subsequent instructions (i.e., the processor's instruction set architecture may remain unchanged except with regard to those specific instructions associated with actually loading or storing pointers). Of course, to nonetheless distinguish between long and short pointers as stored in memory 12, the processor 10 converts pointers in the common format into long or short pointers for storing in memory 12.

In at least some embodiments, the processor 10 converts between the common format and long or short pointers by adding or removing padding, e.g., as needed for achieving certain predetermined results associated with the memory 12 or register file 14. For example, the processor 10 may add or remove padding from long or short pointers, as needed to make pointers load into the register file 14 with a predetermined size that is associated with the common format. Conversely, the processor 10 may add or remove padding from pointers in the common format, as needed to make long or short pointers store in the memory 12 with some predetermined alignment (e.g., a particular word alignment, where a word comprises a certain predetermined number of bits). This alignment may make memory accesses more efficient.

Figure 2:
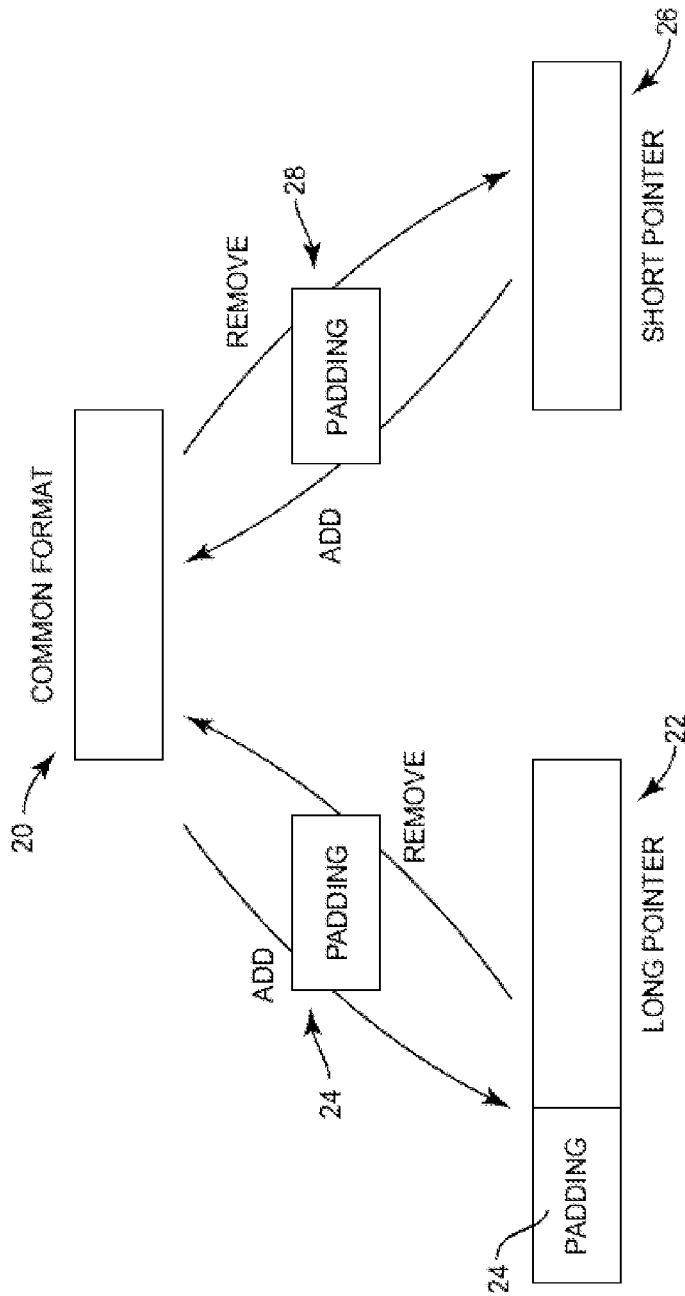
FIG. 2 is a block diagram illustrating conversion processing implemented by a digital processor according to some embodiments for converting between a common pointer format and long or short pointers, by adding or removing padding.

Consider, for example, FIG. 2. In FIG. 2, the processor 10 converts pointers in the common format 20 into long pointers 22, for storing in memory 12, by adding padding 24. In adding this padding 24, the processor 10 makes long pointers 22 store in the memory 12 with a predetermined alignment that would not have otherwise occurred by storing pointers in the common format 20 directly. Conversely, the processor 10 converts long pointers 22 into the common format 20 by removing padding 24. In removing this padding 24, the processor 10 makes long pointers 22 load into the register file 14 with a predetermined size.

The processor 10 may convert between the common format 20 and short pointers 26 in an analogous manner. However, because short pointers 26 are relatively smaller in size as stored in the memory 12 than long pointers 22, the amount of padding 24 added or removed by the processor 10 may be different from that associated with conversion of long pointers 22.

Moreover, in some embodiments, and as shown in FIG. 2, short pointers 26 inherently align in memory 12 without any added padding, but instead require padding in order to load into the register file 14 with the predetermined size. Thus, in FIG. 2, the processor 10 converts short pointers 26 into the common format 20 by adding padding 28. In adding this padding, the processor 10 makes short pointers 26 load into the register file 14 with the predetermined size. Similarly, the processor 10 converts pointers in the common format 20 into short pointers 26, for storing in memory 12, by removing padding 28. In removing this padding 28, the processor 10 makes short pointers 26 store in the memory 12 with the predetermined alignment.

Figure 3B:
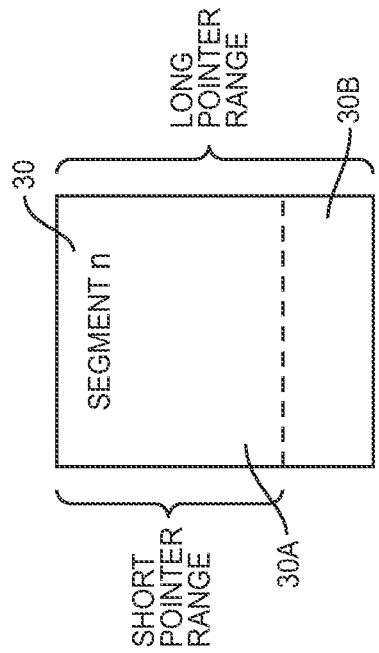
FIGS. 3A-3B are block diagrams illustrating additional details regarding distinctions between long and short pointers in terms of their address range capability, according to one or more embodiments.
Figure 3A:
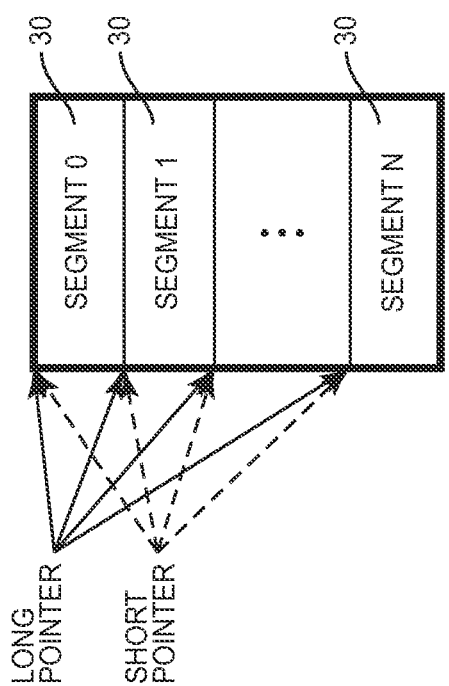

FIGS. 3A-3B illustrate additional details regarding distinctions between long and short pointers 22, 26, according to one or more embodiments. As shown in FIG. 3A, the logical address space 16 of memory 12 comprises a predetermined number of logical segments 30 (e.g., segment 0, 1 ... N). Each of these segments 30 includes a number of logical addresses. Both long and short pointers 22, 26 reference any one of the segments 30 in the sense that the ultimate logical address referenced by the pointer may be included within any one of those segments 30. Long and short pointers 22, 26 differ, however, in that long pointers 22 reference any address within a segment 30, while short pointers 26 reference any address in only a subset of a segment 30. FIG. 3B illustrates this difference more particularly.

FIG. 3B depicts one segment 30 of the memory's logical address space 16. A long pointer 22 may reference any of the addresses within this segment 30; that is, a long pointer 22 has full address range capability across the segment 30. A short pointer 26, by contrast, may only reference some of the addresses within the segment 30, i.e., a short pointer 26 has limited address range capability across the segment 30. As shown, for example, a short pointer 26 may reference any address within portion 30A of the segment 20, but may not reference any address within portion 30B. In the embodiments of FIGS. 3A-3B, therefore, a short pointer 26 references any address in a subset 18 of the memory's logical address space 16, where such subset 18 consists of non-contiguous portions 30A of logical memory segments 30.

In further detail, a pointer according to various embodiments comprises some bits that indicate a particular segment 30 of the memory's logical address space, and other bits that indicate a particular address within that segment 30. These bits collectively reference a particular address within the memory's logical address space 16. According to some embodiments, one difference between long pointers and short pointers 22, 26 is that short pointers 26 comprise a fewer number of bits that indicate a particular address within a segment 30. With a fewer number of these bits, short pointers 26 reference any address in only a subset of a segment 30.

The processor 10 is configured in these embodiments to account for the fewer number of bits when converting short pointers 26 to and from the common format 20. For example, the processor 10 in some cases converts short pointers 26 into the common format 20, for loading into the register file 14, by adding padding to those bits that indicate a particular address within a segment 30. As discussed above with respect to FIG. 2, the processor 10 may add this padding to make short pointers 26 load into the register file 14 with a predetermined size that is associated with the common format 20. Likewise, the processor 10 converts pointers in the common format 20 to short pointers 26, for storing in the memory 12, by extracting one or more of those bits, but not the padding. Again as discussed above, the processor 10 may remove this padding to make short pointers 26 store in the memory 12 with a predetermined alignment.

Figure 4A:
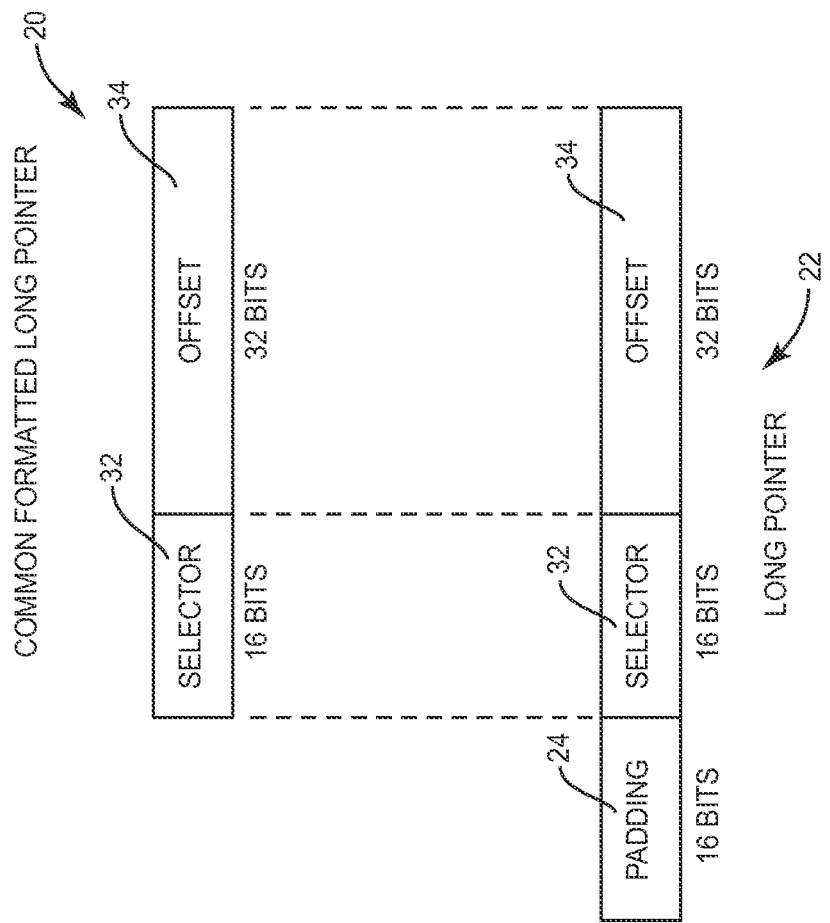
FIGS. 4A-4B are block diagrams illustrating specific embodiments of a 32 bit short pointer and a 64 bit long pointer, according to some embodiments.
Figure 4B:
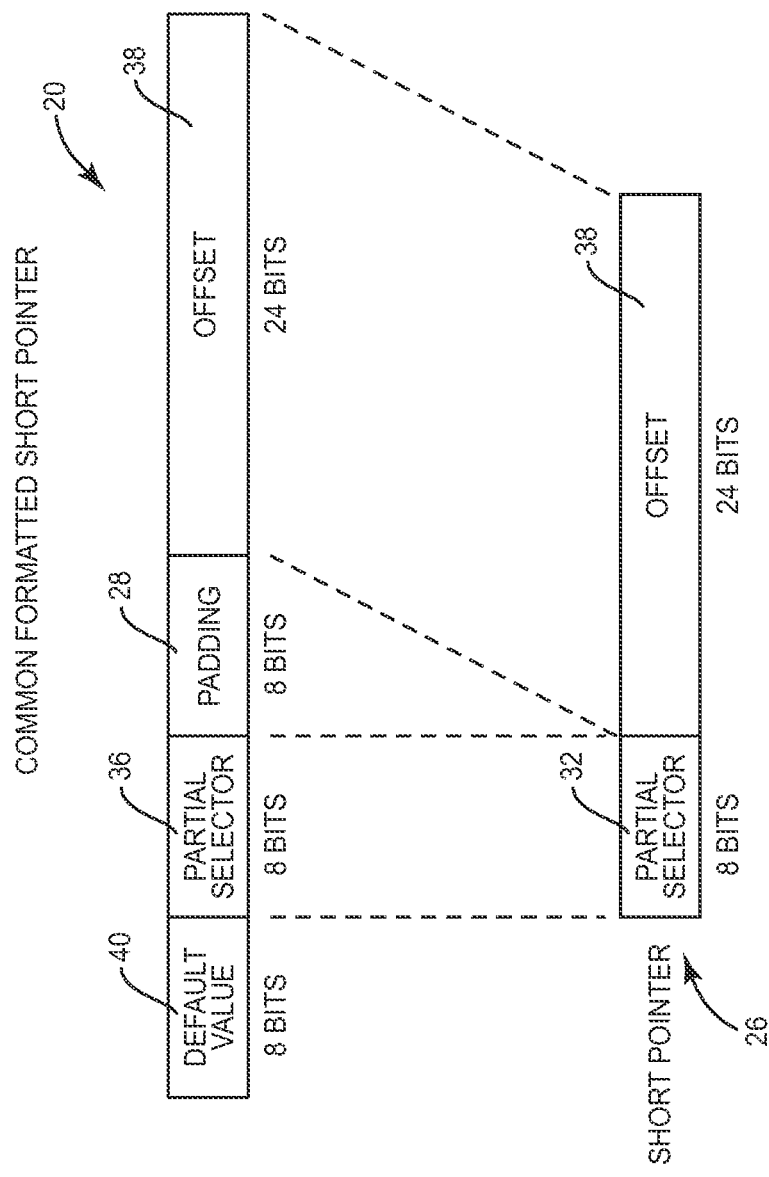

FIGS. 4A-4B illustrate a specific example of these embodiments. In FIGS. 4A-4B, the processor 10 converts pointers in the common format 20 into long or short pointers 22, 26 that store in memory 12 with a quad or double word alignment, respectively, where a word comprises 16 bits. Thus, the processor 10 converts pointers in the common format 20 into long pointers 22 that have a size of 64 bits, and converts pointers in the common format 20 into short pointers 26 that have a size of 32 bits. In converting long or short pointers 22, 26 into the common format 20, the processor 10 makes those pointers 22, 26 load into the register file 14 with a predetermined size of 48 bits.

In more detail, FIG. 4A illustrates a 64 bit long pointer 22 as including padding 24, a selector 32, and an offset 34. The padding 24 and the selector 32 each comprises 16 bits, while the offset 34 comprises 32 bits. The padding 24 is added by the processor 10 as discussed above for memory alignment, and does not indicate any information. The selector 32 and the offset 34 collectively reference any address in the memory's logical address space 16. Specifically, 8 bits of the selector 32 indicate any one of the memory's 256 logical segments 30. The other 8 bits of the selector 32 indicate unique attributes associated with the indicated segment 30. The 32 bits of the offset 34 indicate any one of the $2^{32}$ addresses within the indicated segment 30.

64 bit long pointers 22 in FIG. 4A thus include 16 bits of padding 24 and 48 bits of information (16 bits from the selector 32 and 32 bits from the offset 34) useful for indicating a logical address. Accordingly, the processor 10 in such cases is configured to convert 64 bit long pointers 22 into the 48 bit common format 20 simply by removing the 16 bits of padding 24 from those long pointers 22. Likewise, the processor 10 is configured to convert pointers in the 48 bit common format 20 into 64 bit long pointers 22 simply by adding the 16 bits of padding 24.

FIG. 4B illustrates similar details of a 32 bit short pointer 26. The short pointer 26 includes an 8 bit partial selector 36 and a 24 bit offset 38. The partial selector 36 and bit offset 38 collectively reference any address in a subset 18 of the memory's logical address space 16. Specifically, the 8 bits of the partial selector 36 indicate any one of the memory's 256 logical segments 30. The 24 bits of the offset 38 indicate any one of the $2^{24}$ addresses in a subset 30A of the indicated segment 30.

32 bit short pointers 26 in FIG. 4B thus exclude 8 bits of the selector 32 and 8 bits of the offset 34 otherwise included in the 64 bit long pointers 22 of FIG. 4A. With these bits excluded, the processor 10 is configured to convert 32 bit short pointers 26 into the 48 bit common format 20 by adding an 8 bit default value 40 in place of the 8 excluded selector bits, and by adding an 8 bit padding 28 to the 24 offset bits. Loaded into the register file 14 in this way, commonly formatted short pointers reference any address in a subset 18 of the memory's logical address space 16, and indicate default attributes associated with the indicated segment 30.

Of course, the specific embodiments illustrated in FIGS. 4A-4B merely represent non-limiting examples, as the exact number of bits for the pointers, or for the pointer portions, may differ from those above. In some embodiments, for instance, short pointers 26 are restricted to referencing double word aligned memory locations. This means that n of the least significant bits of logical addresses referenced by short pointers 26 have a "0" value (where n=1, 2, . . . ). Given this requirement, the processor 10 refrains from needlessly storing those n least significant bits in memory 12. To load short pointers 26 into the register file 14, then, the processor 10 just loads the n least significant bits of the register file 14 with default values of "0." Thus, in these cases, the translation of the short pointer 26 into the common format and corresponding addition of padding in a sense increases the address range of short pointers 26, but at the expense of having alignment restrictions. This can also be considered a tradeoff between the granularity of short pointers 26 versus the range of short pointers 26. As a result, in these cases, the padding 28 in FIG. 4 may actually be less than 8 bits, namely 8−n bits, and the offset 38 may effectively have a greater range of $2^{24+n}$ logical addresses.

In this regard, FIGS. 4A-4B are also non-limiting in the sense that a short pointer may reference a subset that has a larger or smaller size (i.e., a larger or smaller address range capability) than the example short pointer 26 shown. In fact, the processor 10 according to some embodiments is actually configured to execute instructions to load or store different types of short pointers, where different types of short pointers reference addresses in subsets of different sizes.

Figure 5A:
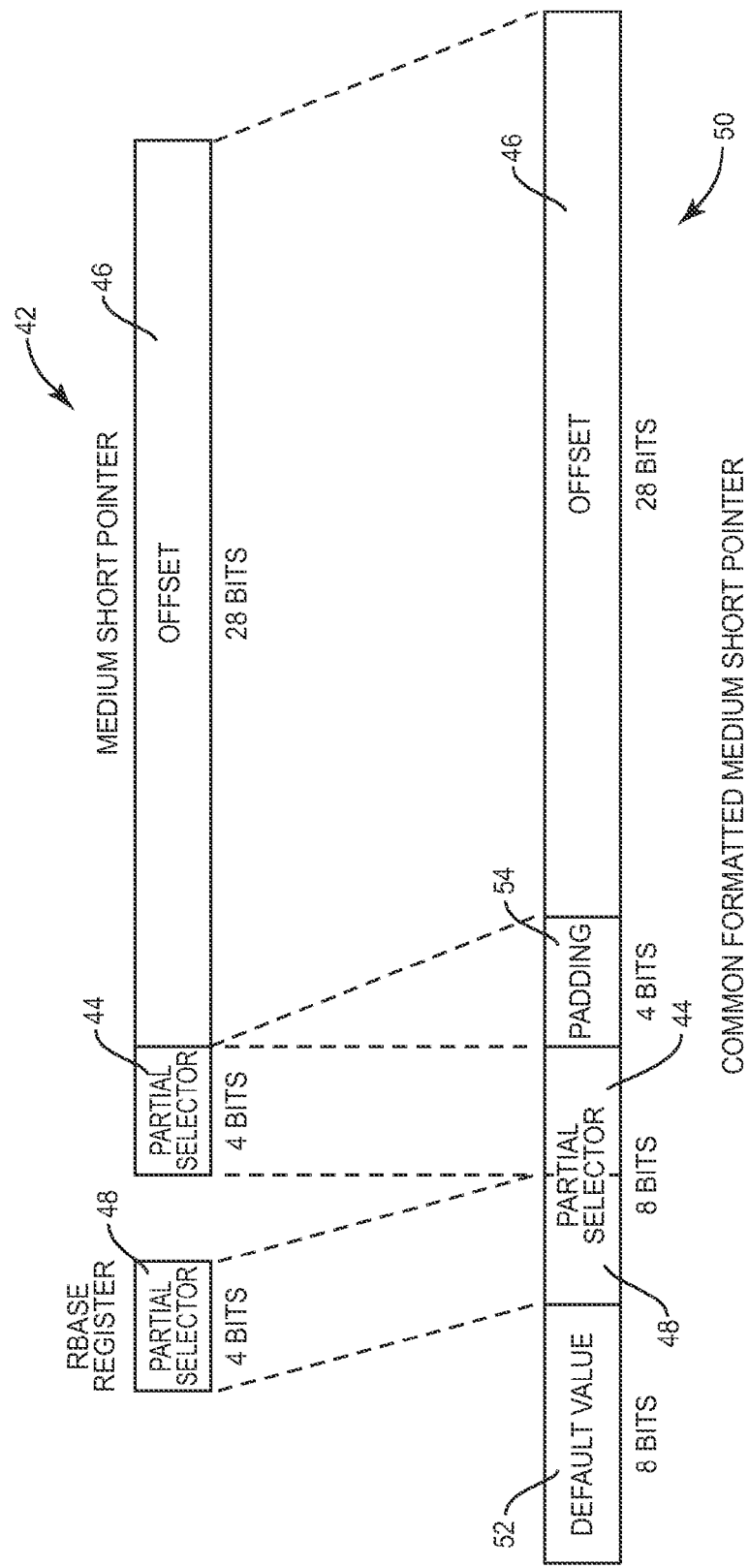
FIGS. 5A-5B are block diagrams illustrating different types of short pointers according to some embodiments.
Figure 5B:
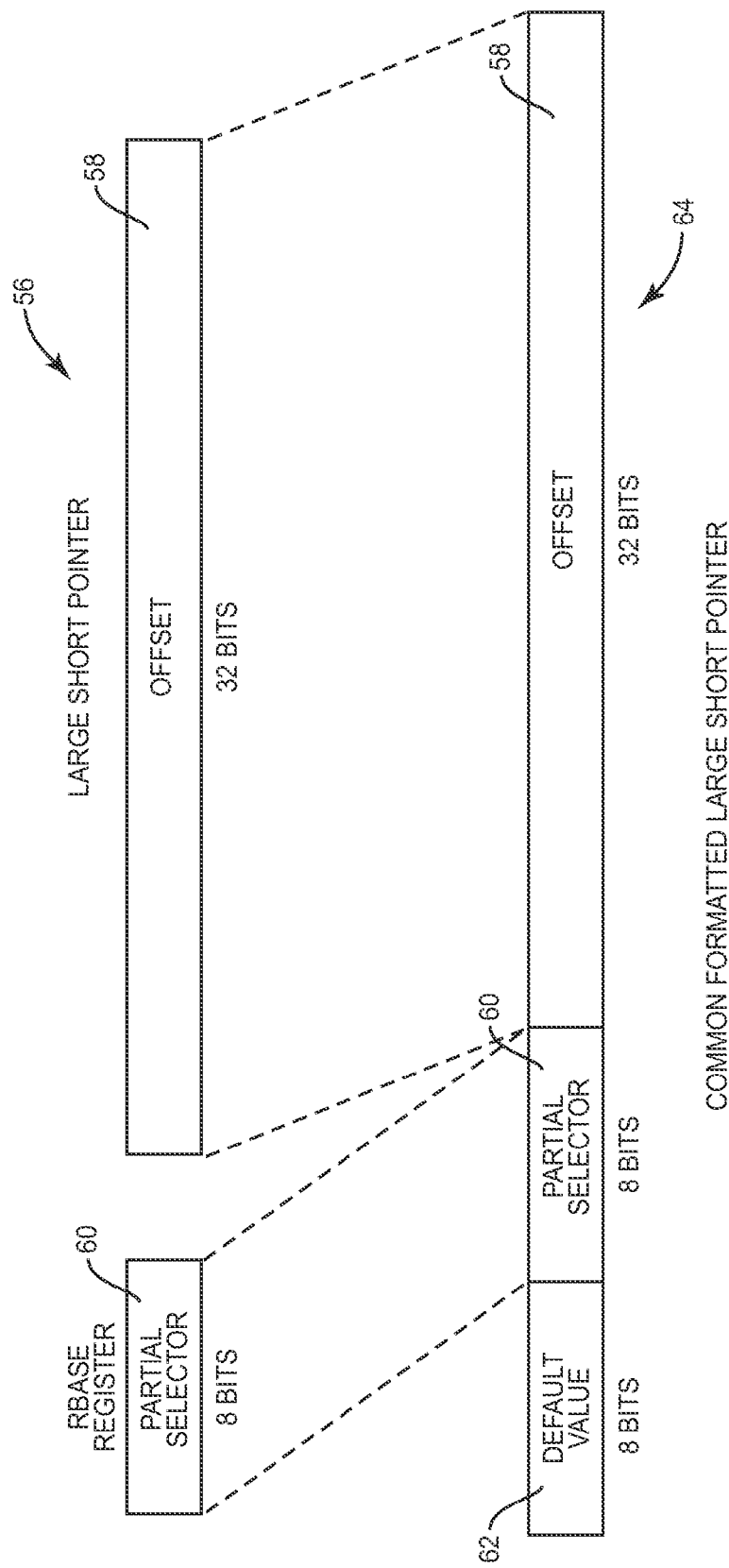

Consider, for example, FIGS. 5A-5B. These figures depict two exemplary types of short pointers (medium and large short pointers, respectively), any or all of which may be used in conjunction with the short pointer illustrated previously in FIG. 4B (also referred to as a small short pointer). In FIG. 5A, a medium short pointer 42 as stored in memory 12 includes a 4 bit partial selector 44 and a 28 bit offset 46. The 4 bits of the partial selector 44, considered alone, indicate any segment 30 in a subset of the segments 30 (e.g., any segment in a subset of 128 segments). The 28 bits of the offset 46 indicate any one of the $2^{28}$ addresses in a subset 30A of an indicated segment 30.

The processor 10 is nonetheless configured to load a medium short pointer 42 so that, as loaded into the register file 14, the commonly formatted pointer 50 indicates any one of the segments 30 (e.g., any of the 256 segments, not just a subset of 128). In particular, the processor 10 is configured to load the medium short pointer 42 from memory 12, and is also configured to load 4 bits from a special register 28 (shown here as RBASE) that indicate any segment 30 in a remaining subset of the segments 30 (e.g., any segment in a subset of the 128 other segments not associated with the 4 bits of the medium short pointer's partial selector 44). Thus, collectively, the 4 bits from the medium short pointer's partial selector 44 and the 4 bits from the special register 28 indicate any one of the 256 segments 30. Similar to the short pointer in FIG. 4B, the processor 10 adds an 8 bit default value 52 and adds padding 54. However, because the medium short pointer 42 as stored in memory 12 included 4 more bits for offset 46, the padding 54 is only 4 bits rather than 8.

In FIG. 5B, a large short pointer 58 as stored in memory 12 simply includes a 32 bit offset 58. The 32 bits of the offset 58 indicate any one of the $2^{32}$ addresses in an indicated segment 30. The large short pointer 58 as stored in memory 12 does not itself indicate this segment 30. This is instead indicated by 8 bits in a special register 60 (which in some embodiments is different from the special register 48 discussed in FIG. 5A). Thus, the processor 10 is configured to load the large short pointer 56 from memory 12, and is also configured to load 8 bits from the special register 60 that indicate any segment 30 in the 256 segments 30. Thus, as loaded into the register file 14, the commonly formatted pointer 64 indicates any one of the segments 30 and any address within a segment 30. Similar to the short pointer in FIG. 4B, the processor 10 adds an 8 bit default value 62. However, because the large short pointer 56 as stored in memory 12 included 8 more bits for offset 58, no padding is added.

Note that the processor 10 may load or store different types of short pointers (e.g., small, medium, or large) as described above by executing the same or different instructions. In some embodiments, for example, the processor 10 is configured to execute the same instruction to load different types of short pointers based on one or more bits of a short pointer that identify its type (e.g., as either small, medium, or large). Consider, for example, FIGS. 6A-6C, which illustrate an entropy encoding technique for implementing type identifying bits within different types of short pointers.

FIG. 6A illustrates a small short pointer 70 according to some embodiments. This small short pointer 70 includes a 1 bit type identifier 72 that identifies the short pointer's type as small. The small short pointer 70 further includes an 8 bit partial selector 74 and a 23 bit offset 76. FIG. 6B illustrates a medium short pointer 80. The medium short pointer 80 includes a 2 bit type identifier 82 that identifies the short pointer's type as medium. The medium short pointer 80 further includes a 4 bit partial selector 84 and a 26 bit offset 86. Finally, FIG. 6C illustrates a large short pointer 90. The large short pointer 90 includes a 2 bit type identifier 92 that identifies the short pointer's type as large. The large short pointer 90 further includes a 30 bit offset 96.

This use of type identifying bits simplifies the processor's instruction set architecture. However, as illustrated in FIGS. 6A-6C, these one or more type identifying bits may replace one or more bits of the pointer's offset or partial selector. Thus, these embodiments trade instruction set architecture simplicity for address range capability.

The extent of instruction set architecture simplification may in some embodiments be limited to load instructions, not store instructions. Indeed, the processor 10 in these embodiments may still be configured to execute different instructions to store different types of short pointers. Here, different instructions store different values for the one or more bits of a short pointer that identify its type.

In other embodiments, the processor 10 is configured to execute the same instruction to store different types of short pointers. In these embodiments, a commonly formatted short pointer, as loaded into the register file 14, includes one or more type identifying bits that describe how the short pointer should be stored in memory 12 (e.g., as a small, medium, or large short pointer). This way, the processor 10 need only execute a single store short pointer instruction for storing a short pointer in memory 12, where the instruction inspects the type identifying bits and stores different types of short pointers for different bit values. Again, the type identifying bits may replace one or more bits of a commonly formatted pointer's offset or selector.

Long pointers may also include the type identifying bits discussed above. In this case, type identifying bits included in a long pointer describe how that long pointer might be stored in memory 12 as a short pointer, e.g., as a small, medium, or large short pointer. Consider an example where a long pointer is stored in memory 12 with type identifying bits. The processor 10 may execute an instruction to load that long pointer into the register file as a commonly formatted pointer. This commonly formatted pointer likewise includes the type identifying bits. The processor 10 may then execute an instruction to store the commonly formatted pointer into memory 12 as a short pointer, rather than a long pointer as originally stored. In doing so, the processor 10 inspects the type identifying bits to determine whether to store the commonly formatted pointer as a small, medium, or large short pointer. Note that, in practice, the type identifying bits may additionally indicate that it is unknown how to store a pointer in memory 12 as a short pointer. In this case, the processor 10 would indicate an exception or error.

Figure 7:
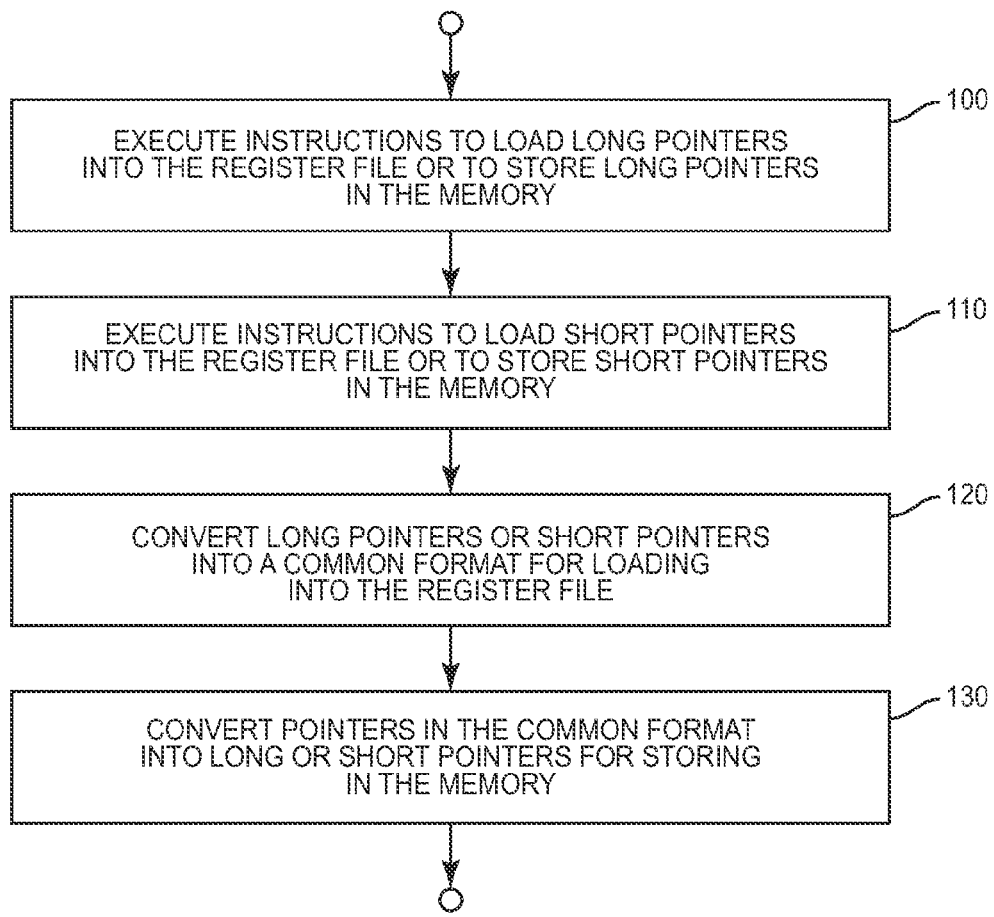
FIG. 7 is a logic flow diagram of a method implemented by a digital processor for storing pointers in a logically segmented memory, according to one or more embodiments.

With the above modifications and variations in mind, those skilled in the art will appreciate that the processor 10 described above generally implements the processing shown in FIG. 7, for processing pointers associated with the logically segmented memory 12. As depicted in FIG. 7, such processing includes executing instructions to load a long pointer into the register file 14, or to store a long pointer in the memory 12 (Block 100). Consistent with the description thus far, a long pointer in this context references any address in the logical address space 16 of the memory 18, which has a predetermined size. Processing also includes executing instructions to load a short pointer into the register file 14, or to store a short pointer in the memory 12 (Block 110). Again consistent with the description thus far, a short pointer references any address in subset 18 of the memory's logical address space 16. Processing further includes converting long pointers or short pointers into a common format for loading into the register file 14 (Block 120). And processing finally includes converting pointers in the common format into long or short pointers for storing in the memory 12 (Block 130). With a short pointer being relatively smaller in size as stored in the memory 12 than a long pointer, this processing advantageously uses less memory when address range requirements are relatively small.

Those skilled in the art will of course appreciate that while the digital processor 10 has been generally described above as being configured to execute instructions to load or store long and short pointers, the processor 10 may be configured to execute other instructions as well. That is, the instructions described above represent just some of the instructions in the instruction set architecture (ISA) implemented by the processor 10. The processor's ISA may therefore also include instructions to load or store other types of data, such as integers. In fact, in one or more embodiments, the processor 10 is configured to execute instructions to load or store integers of different sizes that correspond to sizes of the long and short pointers. For example, the processor 10 in at least one embodiment is configured to execute instructions to load or store 64 bit long pointers and 32 bit short pointers, and is correspondingly configured to execute instructions to load or store 64 bit integers and 32 bit integers.

In this regard, the digital processor 10 may more generally be understood in terms of its relative configuration with respect to integers and pointers. A digital processor 10 in this context is configured to execute instructions to load into the register file 14 or to store in the memory 12 differently sized integers (e.g., 64 bit and 32 bit). The digital processor 10 is also configured to execute instructions to load into the register file 14 or to store in the memory 12 correspondingly sized pointers (e.g., 64 bit and 32 bit).

Embodiments herein thus broadly support differently sized pointers as stored in memory 12. The differently sized pointers provide different address range capabilities, and thereby enable a programmer to use less memory 12 through use of smaller sized pointers if address range requirements permit. Moreover, the differently sized pointers are represented internally in the register file in one common representation or format, which advantageously avoids further modification to the processor's instruction set architecture.

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A digital processor operative to process pointers associated with a logically segmented memory, the digital processor configured to:
   execute instructions to load into a register file or to store in said memory a long pointer that references any address in a logical address space of said memory, the logical address space of predetermined size;
   execute instructions to load into said register file or to store in said memory a short pointer that references any address in a subset of the logical address space;
   convert long pointers and short pointers into a common format for loading into the register file; and
   convert pointers in the common format into long or short pointers for storing in said memory, a short pointer relatively smaller in size as stored in said memory than a long pointer;
   wherein pointers in the common format have a size shorter than the size of long pointers in said memory and longer than the size of short pointers in said memory.

2. The digital processor of claim 1, wherein both long and short pointers reference any one of a predetermined number of segments of the logical address space, and wherein long pointers reference any address within a segment and short pointers reference any address in a subset of a segment.

3. The digital processor of claim 2, wherein as compared to long pointers short pointers comprise a fewer number of predetermined bits that indicate a particular address within a segment, and wherein the digital processor is configured to:
   convert short pointers into the common format by adding padding to said predetermined bits; and
   convert pointers in the common format to short pointers by extracting one or more of said predetermined bits, but not said padding, for storing in said memory.

4. The digital processor of claim 1, configured to convert short pointers into the common format by adding padding to short pointers and to convert long pointers into the common format by removing padding from long pointers.

5. The digital processor of claim 1, wherein said instructions to load into said register file or to store in said memory a short pointer comprise at least one of:
   different instructions respectively dedicated to loading different types of short pointers into said register file; and
   different instructions respectively dedicated to storing different types of short pointers in said memory;
   wherein said different types of short pointers reference addresses in subsets of different sizes.

6. The digital processor of claim 1, further configured to execute the same instruction to load different types of short pointers based on one or more bits of a short pointer that identify its type, different types of short pointers referencing addresses in subsets of different sizes.

7. The digital processor of claim 1, further configured to execute the same instruction to store pointers in the common format in said memory as different types of short pointers, based on one or more bits of a pointer in the common format that identify the type of short pointer in which it is to be stored, different types of short pointers referencing addresses in subsets of different sizes.

8. The digital processor of claim 1, further configured to execute instructions to load into the register file or to store in the memory integers of different sizes that correspond to sizes of said long and short pointers.

9. The digital processor of claim 1, wherein long pointers have a size of 64 bits as stored in the memory and short pointers have a size of 32 bits as stored in the memory.

10. The digital processor of claim 9, wherein long pointers as stored in the memory comprise 8 bits that indicate any one of a predetermined number of segments of the logical address space and 32 bits that indicate any one of the addresses within a segment, and wherein short pointers as stored in the memory comprise 8 bits that indicate any one of said segments and 24 bits that indicate any one of the addresses in a subset of a segment.

11. The digital processor of claim 9, wherein long pointers as stored in the memory comprise 8 bits that indicate any one of a predetermined number of segments of the logical address space and 32 bits that indicate any address within a segment, and wherein short pointers as stored in the memory have any of:
 a first type comprising 8 bits that indicate any one of said segments and 24 bits that indicate any address in a subset of a segment;
 a second type comprising 4 bits that indicate any segment in a subset of said segments and 28 bits that indicate any address in a subset of a segment; and
 a third type comprising 32 bits that indicate any address within a segment.

12. The digital processor of claim 11, configured to load into the register file at least one of said second type and said third type, the processor configured to:
 load a short pointer that has said second type into the register file by both loading the short pointer from the memory and by loading 4 bits from a special register that indicate any segment in a remaining subset of said segments, the short pointer as loaded into the register file thereby indicating any one of said segments and any address in a subset of a segment; and
 load a short pointer that has said third type into the register file by both loading the short pointer from the memory and by loading 8 bits from a special register that indicate any one of said segments, the short pointer as loaded into the register file thereby indicating any one of said segments and any address within a segment.

13. The digital processor of claim 1, wherein:
 executing the instructions to load short pointers or long pointers into the register file causes the processor to convert the short pointers or long pointers into the common format; and
 executing the instructions to store short pointers or long pointers in said memory causes the processor to convert pointers in the common format into short pointers or long pointers.

14. A method in a digital processor operative to process pointers associated with a logically segmented memory, the method comprising:
 executing instructions to load into a register file or to store in said memory a long pointer that references any address in a logical address space of said memory, the logical address space of predetermined size;
 executing instructions to load into said register file or to store in said memory a short pointer that references any address in a subset of the logical address space;
 converting long pointers and short pointers into a common format for loading into the register file; and
 converting pointers in the common format into long or short pointers for storing in said memory, a short pointer relatively smaller in size as stored in said memory than a long pointer;
 wherein pointers in the common format have a size shorter than the size of long pointers in said memory and longer than the size of short pointers in said memory.

15. The method of claim 14, wherein both long and short pointers reference any one of a predetermined number of segments of the logical address space, and wherein long pointers reference any address within a segment and short pointers reference any address in a subset of a segment.

16. The method of claim 15, wherein as compared to long pointers short pointers comprise a fewer number of predetermined bits that indicate a particular address within a segment, and wherein the method comprises:
 converting short pointers into the common format by adding padding to said predetermined bits; and
 converting pointers in the common format to short pointers by extracting one or more of said predetermined bits, but not said padding, for storing in said memory.

17. The method of claim 14, comprising converting short pointers into the common format by adding padding to short pointers and converting long pointers into the common format by removing padding from long pointers.

18. The method of claim 14, wherein said instructions to load into said register file or to store in said memory a short pointer comprise at least one of:
 different instructions respectively dedicated to loading different types of short pointers into said register file; and
 different instructions respectively dedicated to storing different types of short pointers in said memory;
 wherein said different types of short pointers reference addresses in subsets of different sizes.

19. The method of claim 14, comprising executing the same instruction to load different types of short pointers based on one or more bits of a short pointer that identity its type, different types of short pointers referencing addresses in subsets of different sizes.

20. The method of claim 14, comprising executing the same instruction to store pointers in the common format in said memory as different types of short pointers, based on one or more bits of a pointer in the common format that identify the type of short pointer in which it is to be stored, different types of short pointers referencing addresses in subsets of different sizes.

21. The method of claim 14, further comprising executing instructions to load into the register file or store in the memory integers of different sizes that correspond to sizes of said long and short pointers.

22. The method of claim 14, wherein long pointers have a size of 64 bits as stored in the memory and short pointers have a size of 32 bits as stored in the memory.

23. The method of claim 22, wherein long pointers comprise 8 bits that indicate any one of a predetermined number of segments of the logical address space and 32 bits that indicate any address within a segment, and wherein short pointers comprise 8 bits that indicate any one of said segments and 24 bits that indicate any address in a subset of a segment.

24. The method of claim 22, wherein long pointers comprise 8 bits that indicate any one of a predetermined number of segments of the logical address space and 32 bits that indicate any address within a segment, and wherein short pointers have any of:

a first type comprising 8 bits that indicate any one of said segments and 24 bits that indicate any address in a subset of a segment;

a second type comprising 4 bits that indicate any segment in a subset of said segments and 28 bits that indicate any address in a subset of a segment; and a third type comprising 32 bits that indicate any address within a segment.

25. The method of claim 24, comprising loading into the register file at least one of said second type and said third type, wherein:

loading a short pointer that has said second type into the register file comprises both loading the short pointer from the memory and loading 4 bits from a special register that indicate any segment in a remaining subset of said segments, the short pointer as loaded into the register file thereby indicating any one of said segments and any address in a subset of a segment; and loading a short pointer that has said third type into the register file comprises both loading the short pointer from the memory and loading 8 bits from a special register that indicate any one of said segments, the short pointer as loaded into the register file thereby indicating any one of said segments and any address within a segment.

26. The method of claim 14, wherein:

executing the instructions to load short pointers or long pointers into the register file causes the processor to convert the short pointers or long pointers into the common format; and executing the instructions to store short pointers or long pointers in said memory causes the processor to convert pointers in the common format into short pointers or long pointers.

27. A digital processor operative to process pointers associated with a logically segmented memory, the digital processor configured to:

execute first instructions to load into a register file or to store in said memory integers having a plurality of integer sizes; and execute second instructions, distinct from the first instructions, to load into a register file or to store in said memory pointers having a plurality of pointer sizes;

wherein each integer size in the plurality of integer sizes has a one-to-one correspondence with a pointer size in the plurality of pointer sizes.

* * * * *